United States Patent

Hamano

[11] Patent Number: 5,949,868
[45] Date of Patent: Sep. 7, 1999

[54] CALL PROCESSING FOR INTELLIGENT NETWORK

[75] Inventor: Masaki Hamano, Tokyo, Japan

[73] Assignee: NEC Corporation, Tokyo, Japan

[21] Appl. No.: 08/823,230

[22] Filed: Mar. 24, 1997

[30] Foreign Application Priority Data

Mar. 26, 1996 [JP] Japan .................................. 8-069912

[51] Int. Cl.⁶ .............................. H04M 7/00; H04M 3/42
[52] U.S. Cl. ........................... 379/219; 379/207; 379/229
[58] Field of Search .................................... 379/219, 220, 379/221, 222, 229, 242, 191, 196, 197, 201, 207

[56] References Cited

U.S. PATENT DOCUMENTS 5,481,603  1/1996  Gutierrez et al. ....................... 379/221
5,748,724  5/1998  Sonnenberg ............................. 379/212

FOREIGN PATENT DOCUMENTS 7-73147  3/1995  Japan .

Primary Examiner—Harry S. Hong
Assistant Examiner—Benny Q. Tieu
Attorney, Agent, or Firm—Sughrue, Mion, Zinn, Macpeak & Seas, PLLC

[57] ABSTRACT

A call processing system for an intelligent network that reduces a load imposed on a service controlling point and increases the number of completed calls. The call processing system for an intelligent network includes number translation table provided in a service exchange point and having dial numbers and corresponding translation numbers stored therein. When a call is inputted from the outside to the service exchange point, the dial numbers and the translation numbers stored in the number translation table are accessed, and a translation number corresponding to the inputted call is outputted.

4 Claims, 4 Drawing Sheets

CALL PROCESSING FOR INTELLIGENT NETWORK

BACKGROUND OF THE INVENTION

1. Field of the Invention

This invention relates to a service processing system for an intelligent network.

2. Description of the Related Art

FIG. 1 is a block diagram showing an example of construction of a conventional intelligent network.

The present conventional example includes, as shown in FIG. 1, SCP (service controlling point) 110 in which DB (data base) 112 for controlling various services of the intelligent network (hereinafter referred to as IN), IP (resource) 130 which is required in a process in which service control of the IN is performed, LX-SSP (service exchanging point) 120a and PX-SSP (service exchanging point) 120c for realizing a service requested by a call in accordance with control information outputted from SCP 110, and SX-SSP (service exchanging point) 120b having IP 130 for realizing a service in accordance with control information outputted from SCP 110.

In the IN having such a construction as described above, SCP 110 refers to contents stored in advance in DB 112 to perform control of services from origination to disappearance of a call and routing to SX-SSP 120b having IP 130.

Consequently, resources provided in the IN can be concentrated, and the production cost can be reduced comparing with an alternative case wherein resources are arranged discretely in the IN and introduction of new services can be achieved rapidly.

However, the conventional example described above has the following problems.

(1) Since a considerably larger number of SSPs than the SCP are provided, a heavy burden is imposed on the SCP and the processing capacity of the SCP is deteriorated. Consequently, also the processing capacity of the IN is deteriorated.

(2) The quantity of calls processed is normally supervised by the SCP, and when it is estimated that the quantity of calls processed exceeds the processing capacity of the SCP, a signal representing that the quantity of calls should be limited is sent out from the SCP to the SSPs, and no processing is performed for calls of a quantity exceeding the processing capacity of the SCP. Consequently, even if the quantity of calls processed is lower than a level at which the calls can be processed by the SSPs, the calls of the quantity exceeding the processing capacity of the SCP are treated as incompleted calls by overcrowding processing.

SUMMARY OF THE INVENTION

The present invention has been made in view of such problems of the prior art as described above, and it is an object of the present invention to provide a call processing system for an intelligent network which can reduce the burden to be imposed on an SCP and increase completed calls.

In order to attain the object described above, according to the present invention, there is provided a call processing system for an intelligent network, characterized in that it comprises:

an SCP in which a data base for controlling services of said intelligent network is stored; and an SSP for realizing a service requested by a call in accordance with control information outputted from said SCP;

said SSP including:

a number translation table in which dial numbers and translation numbers corresponding to the dial numbers are stored;

false IN call communication processing means for sending out a dial number of a false call at fixed intervals to said SCP;

number translation table detection means for detecting whether or not a dial number of an inputted call and a translation number corresponding to the dial number are registered in said number translation table; and number translation processing means for extracting, when it is discriminated by said number translation table detection means that the dial. number of the inputted call is registered in said number translation table, the translation number corresponding to the dial number of the inputted call from said number translation table;

said SCP including:

false IN call processing means for extracting and outputting, based on the dial number of the false call sent thereto from said false IN call communication processing means, a corresponding translation number from said data base;

said false IN call communication processing means being operable to receive the translation number extracted from said data base by said false IN call processing means and perform updating of the translation number in said number translation table.

The call processing system for an intelligent network is further characterized in that said SSP further includes table registration deletion means for registering data into said number translation table and deleting data stored in said number translation table in response to an input from the outside.

The call processing system for an intelligent network is further characterized in that the dial numbers stored in said number translation table are numbers for a region designating termination accounting service.

In the present invention having the construction described above, when a call is inputted from the outside to the SSP, the dial numbers and the translation numbers stored in the number translation table provided in the SSP are referred to, and a translation number corresponding to the inputted call is outputted.

Consequently, processing of the inputted call is performed without the intervention of the SCP.

Further, a false call is sent out at the fixed intervals from the false IN call communication processing means provided in the SSP to the false IN call processing means provided in the SCP, and a dial number and a corresponding translation number stored in the data base are extracted based on the thus sent out false call. Then, the extracted information is sent out to the SSP and stored into the number translation table.

Consequently, the translation number of the dial number stored into the number translation table is updated at a timing at which the false call is sent out from the false IN call communication processing means.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

In the following, embodiments of the present invention are described with reference to the drawings.

(First Embodiment)

Figure 1:
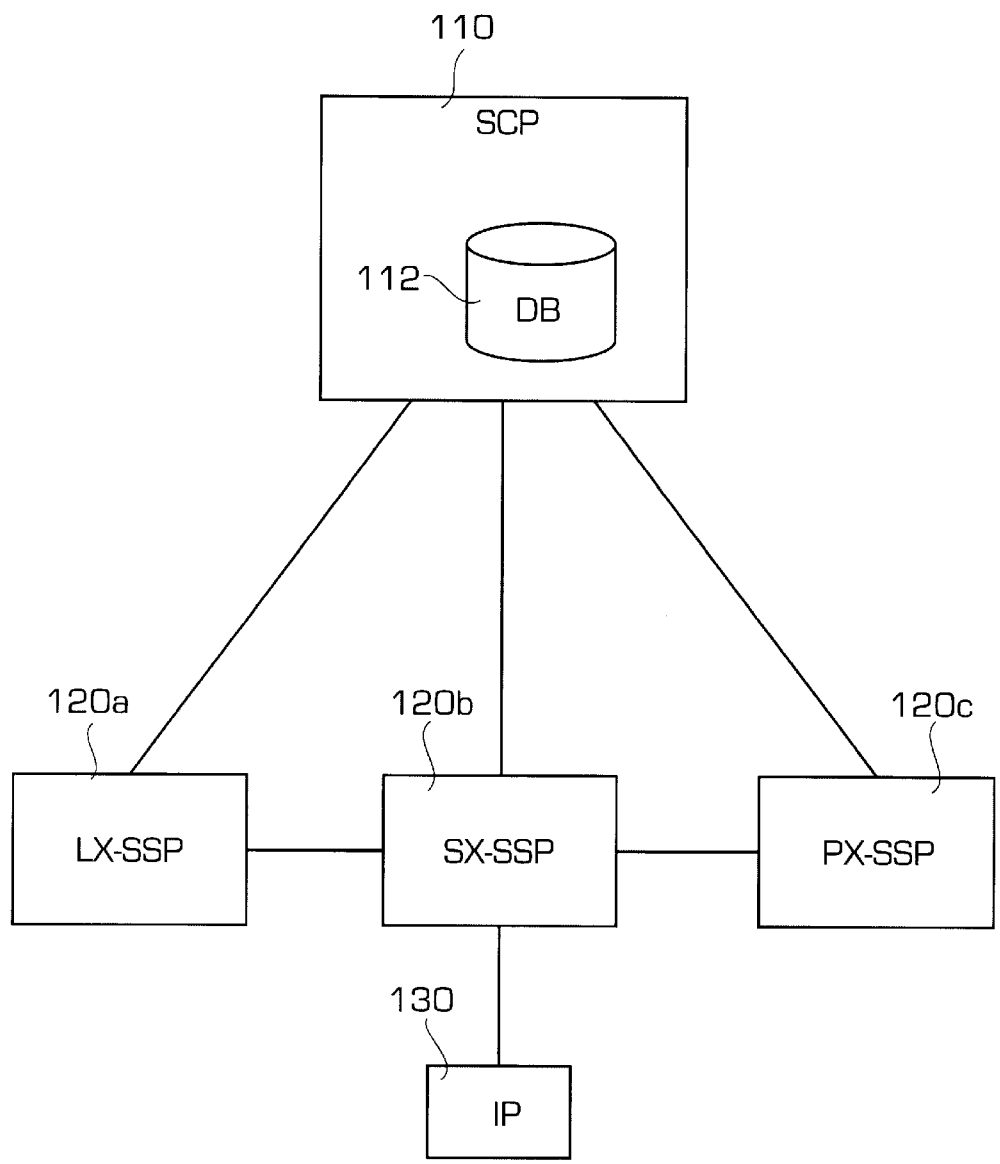
FIG. 1 is a block diagram showing an example of construction of a conventional intelligent network.
Figure 2:
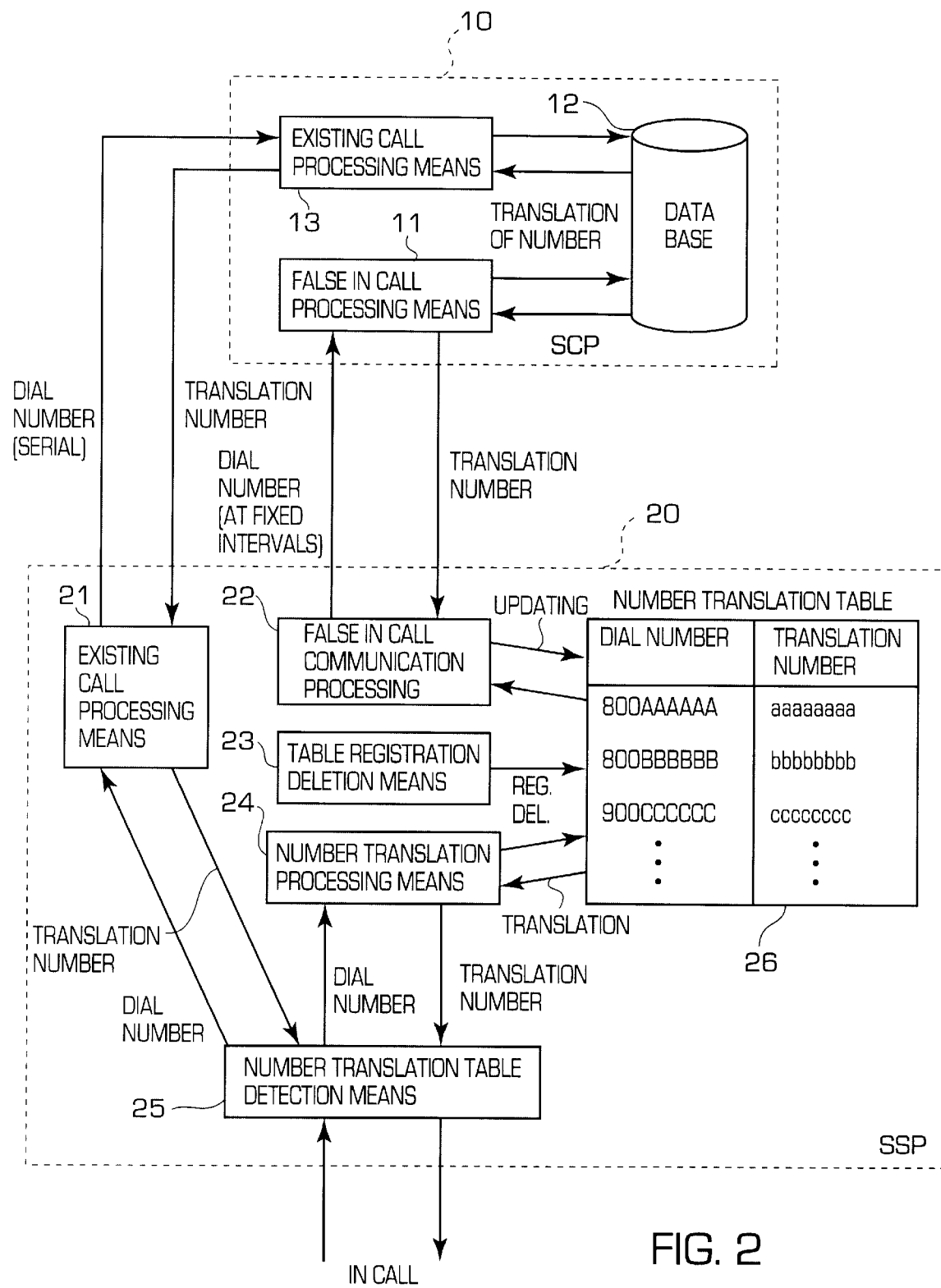
FIG. 2 is a block diagram showing a first embodiment of a call processing system for an intelligent network of the present invention.

FIG. 2 is a block diagram showing a first embodiment of a call processing system for an intelligent network of the present invention.

The present embodiment includes, as shown in FIG. 2, SCP (service controlling point) 10 in which data base 12 for controlling various services of the IN is stored, and SSP (service controlling point) 20 for realizing a service requested by a call in accordance with control information outputted from SCP 10. SCP 10 includes, in addition to data base 12, existing call processing means 13 for processing contents stored in data base 12, and false IN call processing means 11 for extracting, based on a dial number of a false IN call sent at fixed intervals from SSP 20, a corresponding translation number from data base 12. Meanwhile, SSP 20 includes number translation table 26 in which dial numbers and corresponding translation numbers are stored, number translation table detection means 25 for detecting whether or not a dial number of an IN call inputted thereto and a translation number corresponding to the dial number are registered in number translation table 26, existing call processing means 21 for performing processing for SCP 10 in response to the inputted IN call when it is discriminated that the dial number of the IN call inputted to number translation table detection means 25 and the translation number corresponding to the dial number are not registered in number translation table 26, number translation processing means 24 for extracting, when it is discriminated that the dial number of the IN call inputted to the number translation table detection means 25 and the translation number corresponding to the dial number are not registered in number translation table 26, a translation number corresponding to the dial number of the inputted IN call from number translation table 26, false IN call communication processing means 22 for sending out the dial number of the false IN call to false IN call processing means 11 in SCP 10 at fixed intervals and for receiving a translation number corresponding to the dial number sent out from among the translation numbers stored in data base 12 and updating, when the translation number corresponding to dial number has been changed, the translation number in number translation table 26, and table registration deletion means 23 for registering data into number translation table 26 and deleting data stored in number translation table 26.

Here, the dial numbers stored in number translation table 26 are such 800 numbers used for a region designating termination accounting service such as "800AAAAAA" and the translation numbers are such subscriber numbers as "aaaaaaaa". It is to be noted that the dial numbers are not limited to 800 numbers but may be 900 numbers.

Meanwhile, the false IN call is transmitted periodically (for example, at intervals of 30 minutes) to SCP 10 since the translation number on a table in data base 12 is sometimes changed by TDRTD (Time of Day Routing: routing for changing a termination number depending upon the time) or the like. Consequently, the latest translation number on the table in data base 12 is stored into number translation table 26.

Further, in SCP 10, a service logic program, which is limited to ODROGA (routing for changing the termination number depending upon the origination area), TDRDY (routing for changing the termination number depending upon the date), TDRDW (routing for changing the termination number depending upon the day of the week), CFCB (routing for changing the termination number depending upon that the termination number is busy), CFCDA (routing for changing the termination number depending upon the time-out of the call) and TDRTD mentioned hereinabove, is prepared for call processing of the false IN call. Therefore, accessing by the false IN call is performed to data base 12 similarly as in accessing in existing call processing, and the quite same termination number (translation number) as that in existing call processing is obtained.

In the following, processing operation of the call processing system for an intelligent network having the construction described above is described.

Figure 3:
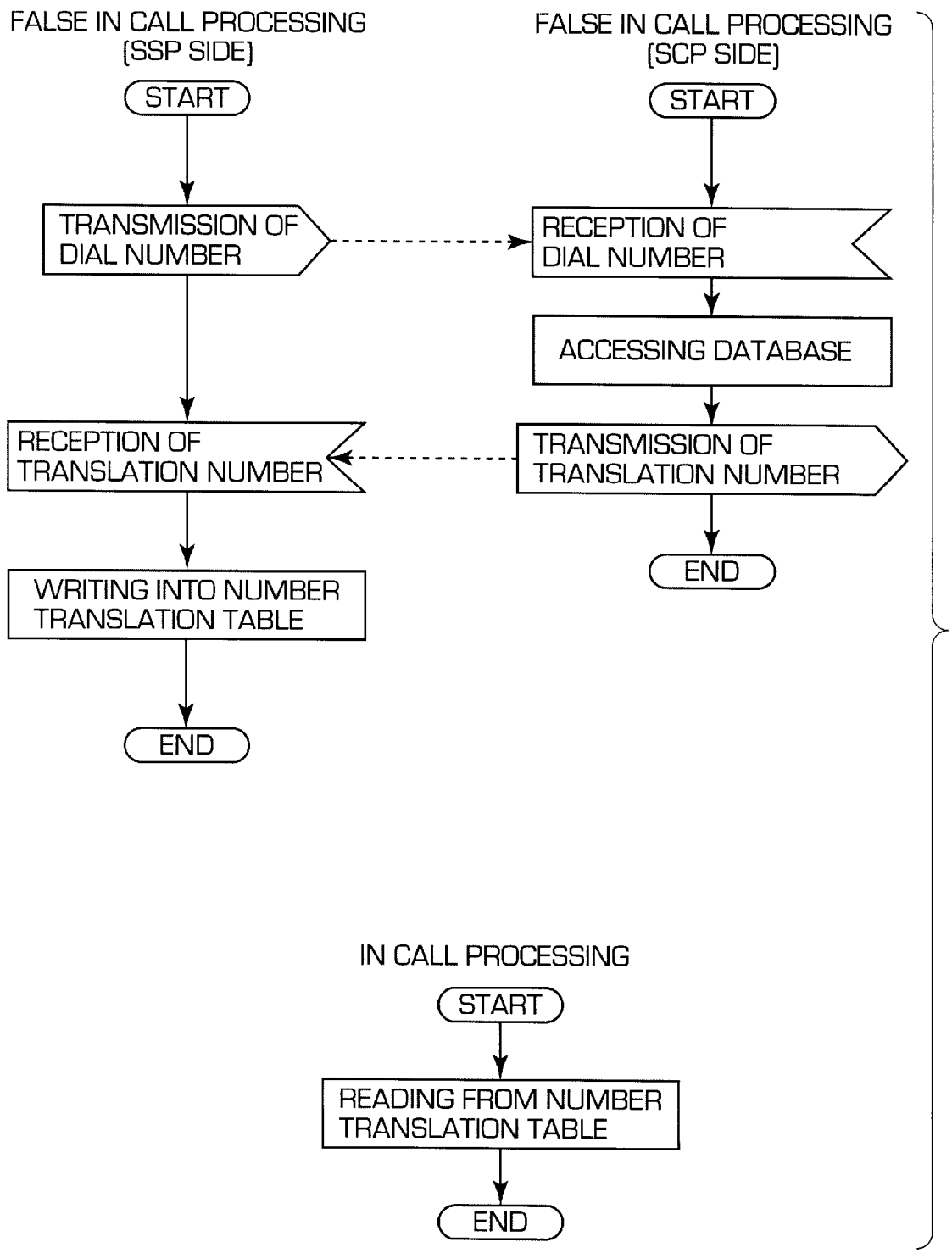
FIG. 3 is a flow diagram illustrating a flow of processing operation of the call processing system for an intelligent network shown in FIG. 2.

FIG. 3 is a flow diagram illustrating a flow of processing operation of the call processing system for an intelligent network shown in FIG. 2.

First, when the time for registration of a dial number and a translation number into number translation table 26 in SSP 20 or for periodical inquiry to SCP 10 comes, a false IN call is transmitted from false IN call communication processing means 22 in SSP 20 to false IN call processing means 11 in SCP 10. It is to be noted that the false IN call transmitted includes a dial number.

When the false IN call transmitted from false IN call communication processing means 22 is received by false IN call processing means 11, accessing to data base 12 is performed by false IN call processing means 11, and a translation number corresponding to the dial number included in the false IN call transmitted from false IN call communication processing means 22 is extracted from among the translation numbers stored in data base 12.

Then, the translation number extracted from data base 12 is transmitted to false IN call communication processing means 22.

When the translation number extracted from data base 12 is received by false IN call communication processing means 22, the translation number in number translation table 26 is updated.

Further, updating of a translation number in number translation table 26 is performed also when a command "LTR" is inputted from a terminal provided externally. In this instance, updating of the translation number in number translation table 26 is performed by table registration deletion means 23.

Thereupon, call processing is performed between false IN call communication processing means 22 and false IN call processing means 11, and the translation number extracted from data base 12 is obtained.

Next, processing operation when an IN call (dial number) is inputted from the outside to SSP 20 is described.

If an IN call is inputted from the outside to SSP 20, then it is detected by number translation table detection means 25 via number translation processing means 24 whether or not a dial number of the inputted IN call and a translation number corresponding to the dial number are present in number translation table 26.

If it is discriminated, in the processing operation described above, that the dial number of the inputted IN call and the corresponding translation number are not present in number translation table 26, then the translation number stored in data base 12 of SCP 10 is extracted via existing call processing means 21.

On the other hand, if it is discriminated, in the processing operation described above, that the dial number of the inputted IN call and the corresponding translation number are present in number translation table 26, then the translation number stored in number translation table 26 is extracted by number translation processing means 24.

(Second Embodiment)

Figure 4:
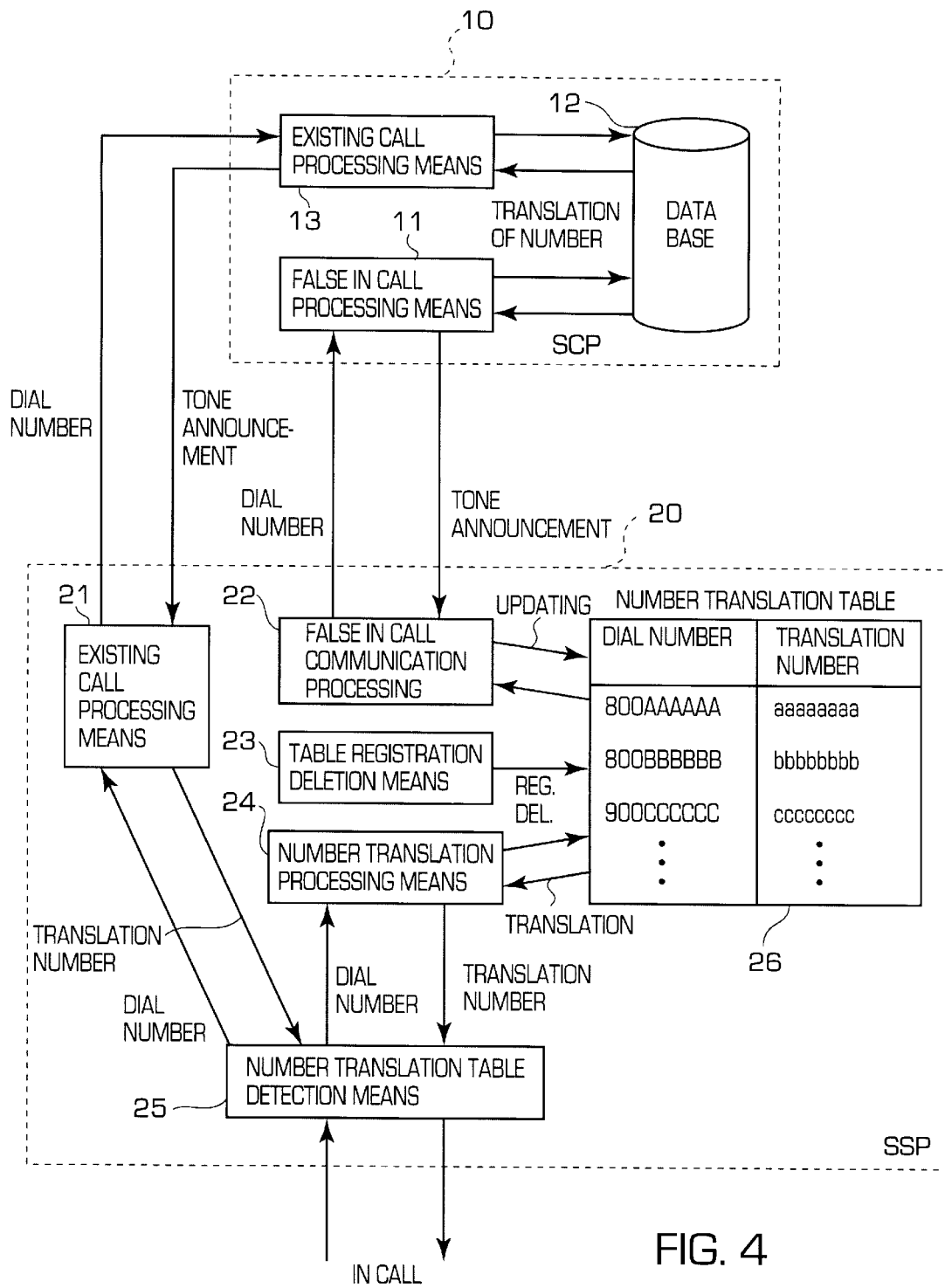
FIG. 4 is a block diagram showing a second embodiment of a call processing system for an intelligent network of the present invention.

FIG. 4 is a block diagram showing a second embodiment of a call processing system for an intelligent network of the present invention.

While the system described above in connection with the first embodiment outputs a translation number, the present embodiment outputs a tone or an announcement.

Generally, when a translation number corresponding to an inputted IN call is not present in data base 12, the call is connected to a tone called NUT, and the tone is outputted.

In the present embodiment, tones corresponding to dial numbers are stored in number translation table 26 in processing of a false IN call, and when the false IN call is inputted to SSP 20, a tone is outputted without the intervention of SCP 10.

In the meantime, where an area to which the SSP is allocated in the ODROGA feature cannot enjoy a service, the announcement of "No service is available from this region." can be outputted.

As described above, since the present invention is constructed such that, when a call is inputted from the outside to the SSP, the dial numbers and the translation numbers stored in the number translation table provided in the SSP are referred to and a translation number corresponding to the inputted call is outputted, the following effects ar exhibited.

(1) Processing of the inputted call can be performed without the intervention of the SCP, and the loads to the SCP and the network between the SCP and the SSP can be reduced.

Consequently, call processing can be performed without being limited by the processing capacity of the SCP.

(2) Since the number of times of inquiry to the SCP is reduced and consequently overcrowding processing is not activated at all, even if the quantity of calls inputted exceeds the processing capacity of the SCP, from among the calls which should otherwise be made incompleted calls by overcrowding processing, those calls which can be processed by the SSP can be made completed calls.

It is to be understood that variation and modifications of CALL PROCESSING SYSTEM FOR INTELLIGENT NETWORK disclosed herein will be evident to those skilled in the art. It is intended that all such modifications and variations be included within the scope of the appended claims.

What is claimed is:

1. A call processing system for an intelligent network, comprising:
   a service control point having a data base for controlling services of said intelligent network; and
   a service switching point for performing a service requested by a call in accordance with control information outputted from said service control point;
   said service switching point comprising:
      a number translation table in which first dial numbers and translation numbers corresponding to said first dial numbers are stored;
      false intelligent network call communication processing means for sending out a dial number of a false call at fixed intervals to said service control point;
      number translation table detection means for detecting whether or not a dial number of an inputted call and a translation number corresponding to said dial number of an inputted call are registered in said number translation table; and
      number translation processing means for extracting, when it is determined by said number translation table detection means that said dial number of an inputted call is registered in said number translation table, the translation number corresponding to said dial number of an inputted call from said number translation table;
   said service control point comprising:
      false intelligent network call processing means for extracting and outputting, based on said dial number of a false call sent thereto from said false intelligent network call communication processing means, a corresponding translation number from said data base;
      said false intelligent network call communication processing means being operable to receive said translation number extracted from said data base by said false intelligent network call processing means and to perform updating of said translation number in said number translation table.

2. A call processing system for an intelligent network as claimed in claim 1, wherein said service switching point comprises table registration deletion means for registering data into said number translation table and for deleting data stored in said number translation table in response to an input from the outside.

3. A call processing system for an intelligent network as claimed in claim 1, wherein dial numbers stored in said number translation table are numbers for an accounting service that designates termination at each area.

4. A call processing system for an intelligent network as claimed in claim 2, wherein said first dial numbers stored in said number translation table are numbers for an accounting service that designates termination at each area.

* * * * *